Jan. 14, 1936.  L. E. WHITTAKER  2,027,411
LENS MOUNT
Filed July 26, 1934  5 Sheets-Sheet 1

Inventor
Lloyd E. Whittaker
by Roberts, Cushman & Woodbury
Attys.

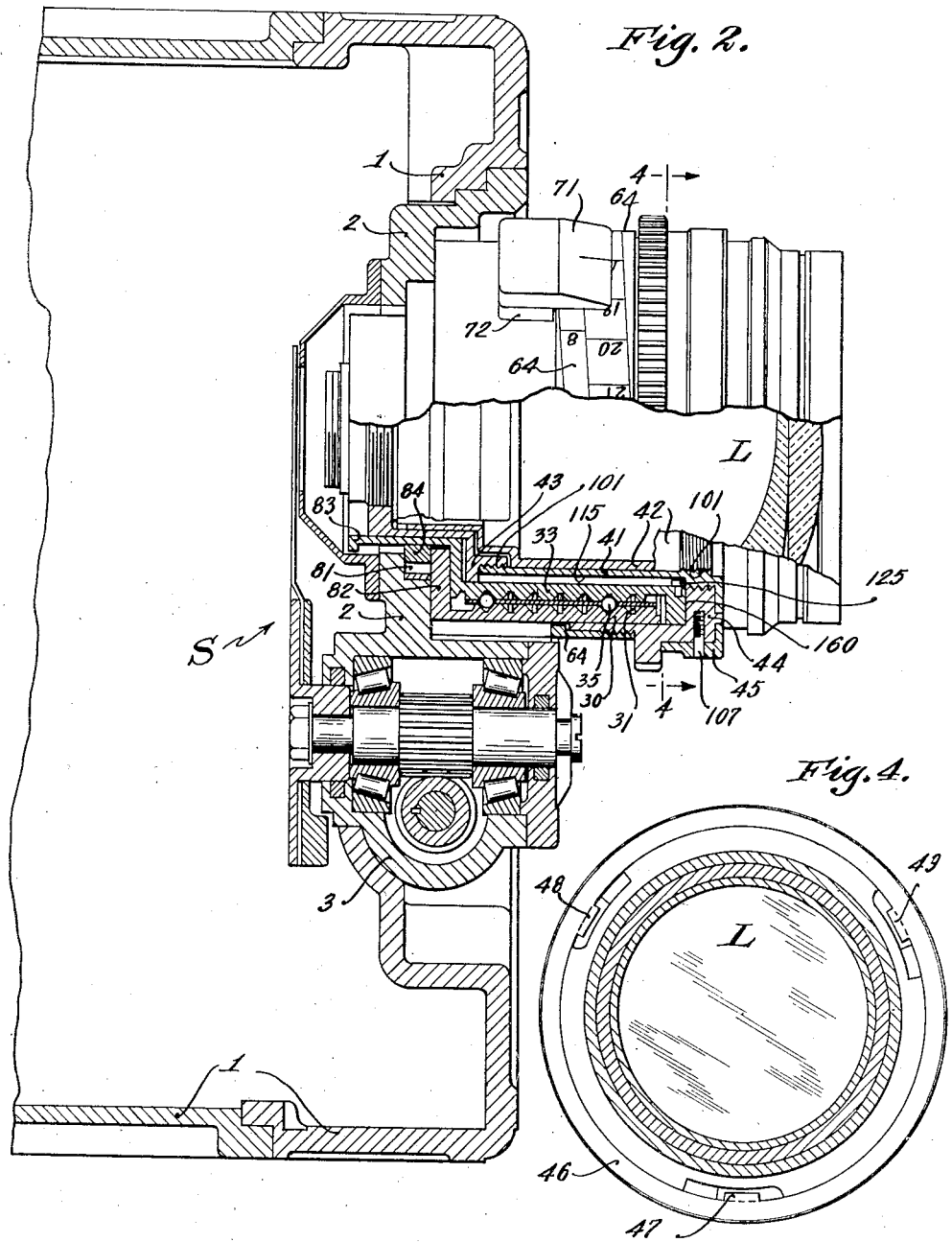

Jan. 14, 1936.   L. E. WHITTAKER   2,027,411
LENS MOUNT
Filed July 26, 1934   5 Sheets-Sheet 3
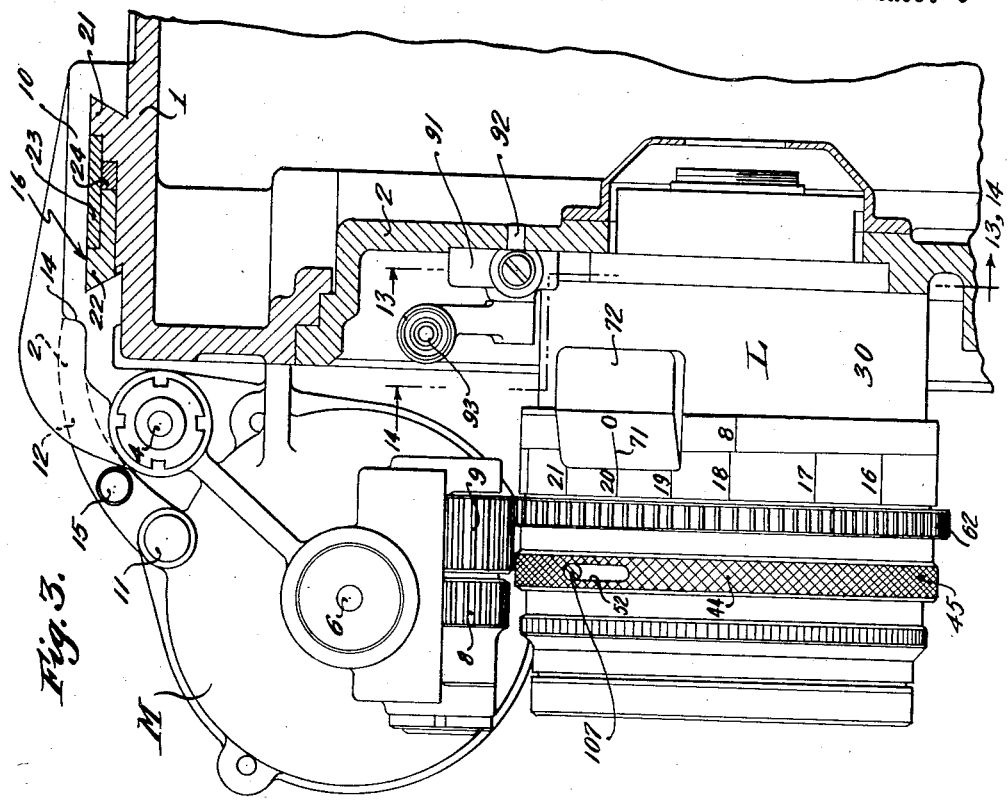
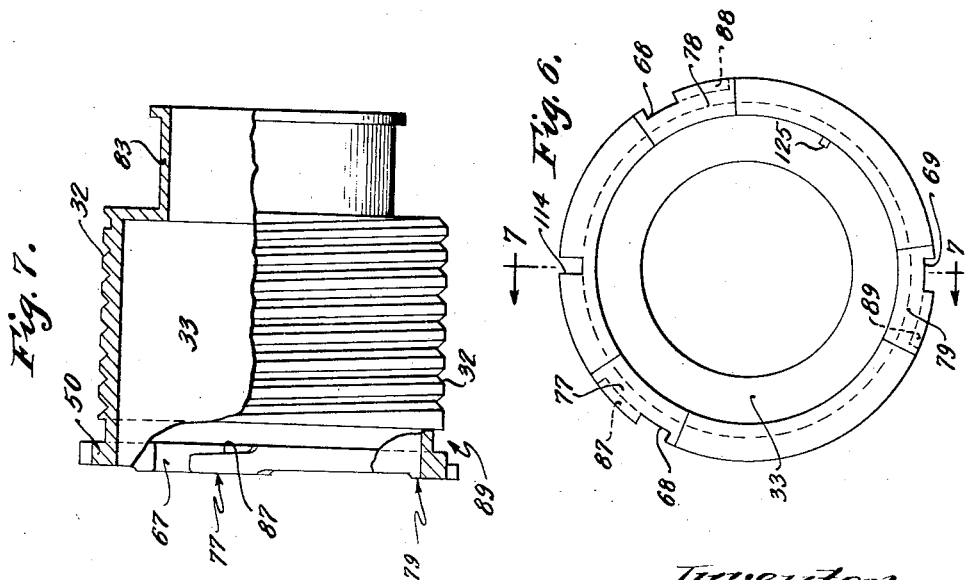

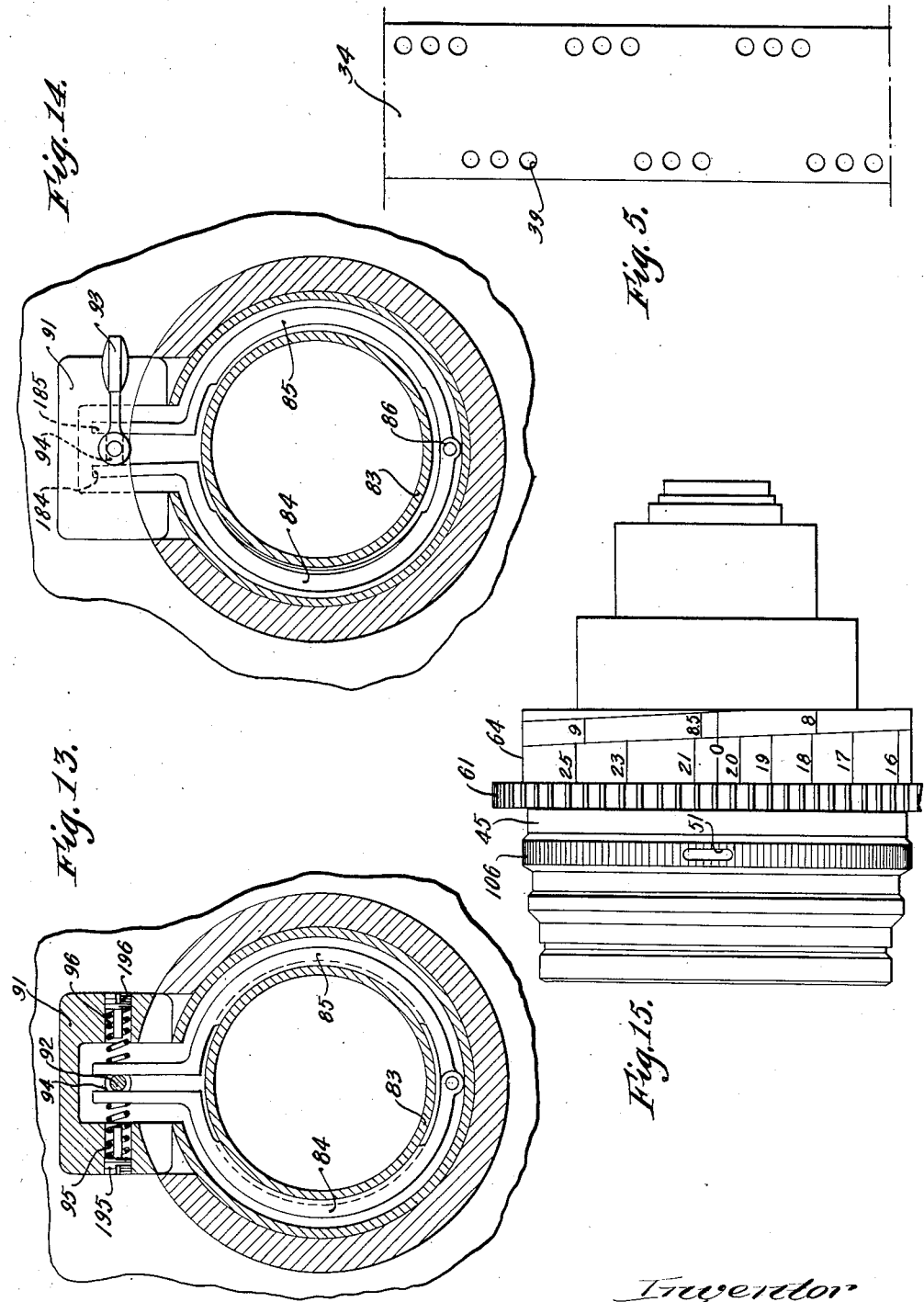

Jan. 14, 1936.  L. E. WHITTAKER  2,027,411
LENS MOUNT
Filed July 26, 1934   5 Sheets-Sheet 5
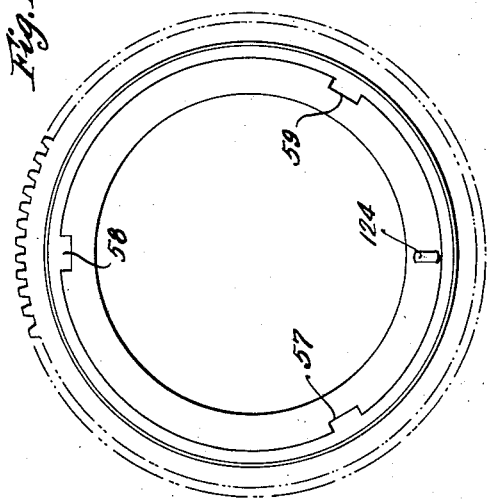
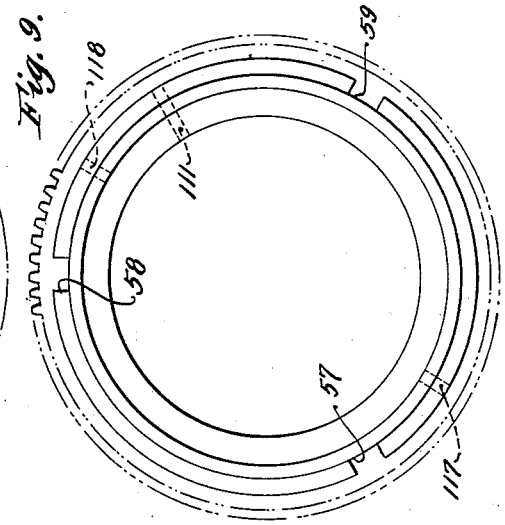
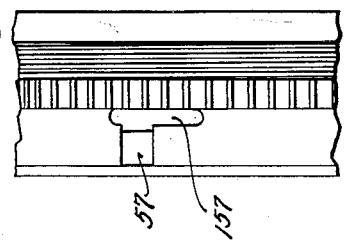
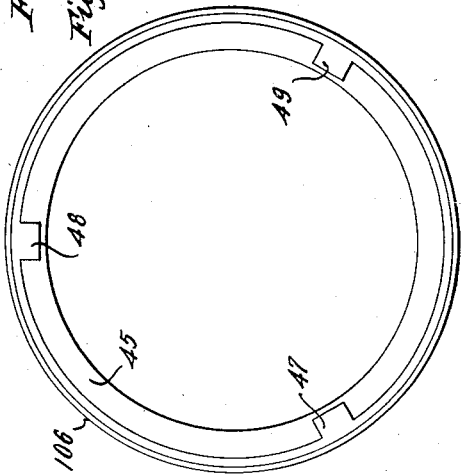

Patented Jan. 14, 1936

2,027,411

UNITED STATES PATENT OFFICE 2,027,411

LENS MOUNT

Lloyed E. Whittaker, Los Angeles, Calif., assignor to Technicolor Motion Picture Corporation, Hollywood, Calif., a corporation of Maine Application July 26, 1934, Serial No. 737,030

14 Claims. (Cl. 95—45)

This invention is applicable to optical apparatus generally, but deals especially with the mounting and the adjustment of lenses in photographic cameras and similar devices.

Certain types of photographic apparatus, especially motion picture cameras, are used with different interchangeable lens systems, which have to be quickly removed and inserted in a simple and convenient manner, and which must also be arranged for easy and yet exact adjustment of their distance from the camera proper, in order to permit focusing.

The present invention deals with an arrangement especially suited for these purposes, and its main objects are to provide a mount for interchangeable lens systems, to provide a novel movement for such lens systems which permits convenient exchange and very easy and yet exact adjustment thereof, and generally to provide an optical lens mount suited for efficient operation under the exacting requirements demanded of such equipment.

These and other objects, features and aspects of the invention will be apparent from the following description of a practical embodiment thereof, by way of example, and from the accompanying drawings in which:

Fig. 2 is a horizontal section on line 2—2 of Fig. 1, with the lens mount partly shown in a plan view;

Fig. 3 is a side elevation of the lens movement, with parts of the camera in vertical section on line 3—3 of Fig. 1;

Fig. 4 is a section on line 4—4 of Fig. 2;

Fig. 5 is a development of the ball cage shown in Fig. 2;

Fig. 6 is a front view of the movable master lens mount sleeve constituting part of the new lens mount;

Fig. 7 is a side elevation, partly in section on line 7—7 of Fig. 6 of the sleeve shown in Fig. 6;

Fig. 8 is an exploded side elevation of the essential parts of an individual lens mount;

Fig. 9 is a front view of the gear ring;

Fig. 10 is a back view of the gear ring;

Fig. 11 is a back view of the lock ring;

Fig. 12 is the side elevation of a slotted portion of the gear ring;

Fig. 13 is a section on line 13—13 of Fig. 3;

Fig. 14 is a section on line 14—14 of Fig. 3; and

Fig. 15 is a side view of an individual lens mount without gear ring and lock ring.

Figure 1:
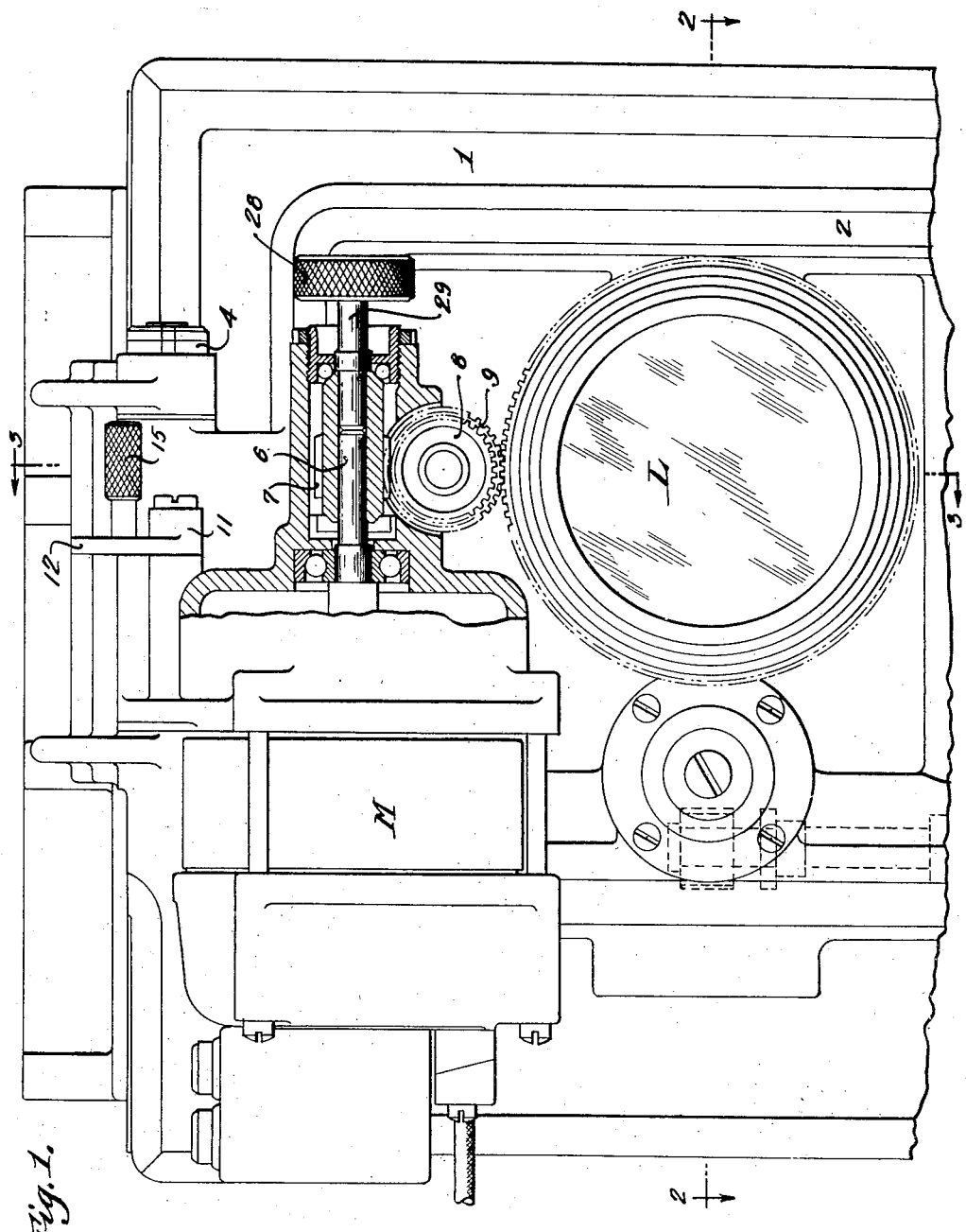
Fig. 1 is the front elevation of a camera embodying the present invention, with the lens mount drive partly shown in vertical section.

Referring to Figs. 1 to 3 of the drawings, 1 is a camera housing and 2 a door hinged to the housing at 3 (Fig. 2) in a manner described in detail in copending application Serial No. 737,031, filed July 26, 1934. Rotatably fixed to a motor mount 10 (Fig. 3), by means of pin 4, may be a control motor M driving through shaft 6 (Fig. 1), worm 7 and gear wheel 8 a control pinion 9 which can be used for adjusting the camera lens in a manner to be described in detail hereinafter. Hinged to the motor housing at 11 is a pawl 12 which, when the motor is in operative position, rests against recess 14 of motor mount 10, thereby preventing lifting of the motor and disengagement of control pinion 9. After raising pawl 12 by means of handle 15, the motor can be swung upwardly in order to permit free access to, and handling of the lens system. Motor mount 10 is fastened to the camera housing with a dovetail key and slot arrangement 16 (Fig. 3), the key comprising a fixed portion 21, a movable portion 22, a retaining plate 23 screwed to 21, and a spreader 24. This arrangement permits adjustment of the motor along the key axis, and fixation thereof by pressing part 22 against the motor mount by suitably actuating spreader 24, which, for example, may be of wedge shape and movable longitudinally of the dovetail.

A hand knob 28 (Fig. 1) on shaft 29, fastened to worm 7, can be used for manually rotating control pinion 9.

Journaled upon door 2 is a shutter and shutter drive S, (Fig. 2) which is described more in detail in the above-mentioned copending application, but is not part of the present invention and therefore only mentioned herein.

Suitably fastened to the door casing 2 is an outer, fixed master lens mount support 30 (Fig. 2) forming a sleeve into the inside surface of which is cut an exact trapezoid thread of the same pitch as the corresponding outside thread 32 of a movable master lens mount 33 of which Fig. 7 is a detail drawing. Inserted between master lens mount sleeve 33 and sleeve 30 is a cage 34 retaining in place steel balls 35, each ball engaging both inside and outside threads of sleeves 30 and 33 respectively. As shown in Fig. 5, which is a developed side view of the ball cage, the latter may for example have six groups of three perforations 39, for eighteen balls, three groups being near each edge of the cage and the groups on each side being staggered in equal distances.

An exchangeable individual lens mount consists of a number of sleeves and rings holding in place the various lens elements of objective L (Fig. 2), outer sleeve 41 alone being material for purposes of the present description.

Sleeve 41 has inside threads 101 (Fig. 2) for lens sleeves 42 and 43 which support the elements of lens system L in suitable manner, and an outside thread 102 (Fig. 8) for inside thread 103 of a gear ring 44, which can be screwed to sleeve 41. The relative position of sleeve 41 and ring 44 may be secured with a screw in tapped hole 111 through both parts. A lock ring 45 with a knurled surface 106 slips over gear ring 44 on which it rotates and to which it is secured by means of two pins 107 screwed into tapped holes 117 and 118 (Fig. 9) of gear ring 44. These pins slide in slots 51 and 52 of lock ring 45, limiting the rotating thereof. The lock ring has also three teeth 47, 48, 49 (Fig. 11) radially protruding inwardly. These teeth correspond to three axial slots 57, 58, 59 (Figs. 9, 10 and 12) of gear ring 44 and three recesses 67, 68, 69 of sleeve 33 (Figs. 6 and 7).

The flange 50 of sleeve 33 (at the left of Fig. 7) has three pads 77, 78, 79 (Figs. 6 and 7) surrounding recesses 67, 68, 69 on the outside of the flange, whereas three helical surfaces 87, 88, 89 are machined into the inside face of flange 50. Slots 57, 58, 59 have peripheral extensions 157 (Figs. 8 and 12) fitting the axial dimension of teeth 47, 48, 49 of lock ring 45.

Sleeve 41 has a slot 115 (Fig. 8) fitting a registering pin 125 (Fig. 6) of sleeve 33. Gear ring 44 has a registering pin 124 (Fig. 10) fitting slot 114 (Fig. 6) of sleeve 33.

It will now be evident that by inserting teeth 47, 48, 49 of lock ring 45 through slots 57, 58, 59 of gear ring 44 into recesses 67, 68, 69 of sleeve 33 and turning lock ring 45 in clockwise direction (when looking towards the camera) in slot extensions 157, the lock ring presses the pads of master mount sleeve 33 against the inner surface 160 of gear ring 44, due to the wedging effect of helical surfaces 87, 88, 89, so that the master lens mount sleeve is effectively, but releasably connected to gear ring 44 with individual lens system L secured thereto at 102, 103 (Fig. 8).

Pin 124 and tooth 125 are unsymmetrically located with respect to teeth 47, 48, 49 of lock ring 45, and therefore permit insertion of the individual lens system in only one predetermined relation to the master mount. The pins 107 slide in slots 51, 52 of lock ring 45, the slots being of sufficient length to permit the locking rotary movement of ring 45 relatively to sleeve 33 and gear ring 44.

Lock ring 44 has a gear 61 adapted to engage gear wheel 9 of motor M. Screwed at 60 to ring 44 and secured with lock nut 61 is a scale sleeve 64 (Fig. 8) on which a helical focusing scale 66 is engraved, which can be read with the aid of index pointer 71 mounted on a pad 72 of fixed sleeve 30 (Fig. 3).

In the hollow annular space 81 (Fig. 2) between lens door casting 2 and flange 82 of fixed sleeve 30 is arranged a locking brake acting on extension 83 (Fig. 7) of movable sleeve 33. As shown in detail in Figs. 13 and 14, two brake shoes 84 and 85, joined with a hinge at 86, and having legs 184 and 185 surround sleeve 83. The two legs 184 and 185 extend into the interior of a hollow brake control housing 91 (Figs. 3, 13 and 14). Through this housing extends a pin 92 having on the outside a control handle 93 and on the inside, between legs 184 and 185, a spreader 94. Two helical springs 95 and 96 in holes of housing 91 and retained in place by screws 195, 196 tend to move legs 184 and 185 together and to press the brake shoes against sleeve 83. It will be evident that in the position of Fig. 13, spreader 94 permits frictional engagement between the brake shoes and the sleeve, whereas, if the spreader is turned 90° with the aid of handle 93, as shown in Fig. 14, legs 184 and 185 are moved outwardly and the brake shoes lifted.

This arrangement is used in the following manner: Assuming that an individual mount is inserted, as shown in Fig. 2, lock ring 45 retains faces 160 of individual mount and master mount sleeve 33 in contact, due to the wedge action between teeth 47, 48, 49 and helical faces 87, 88, 89. Control pinion 9 engages ring gear 61 and, upon rotation of the motor, moves the master mount sleeve 33 with the lens system inwardly or outwardly along the threads of sleeves 30 and 33, balls 35 assuring the absence of play and at the same time an almost frictionless movement. The amount of axial movement of the lens system, corresponding to the focusing distance, can be read with the aid of scale 66 and pointer 71. The brake shoes 84 and 85 should of course be lifted in order to permit rotation of sleeve 33. Pinion 9 is of sufficient breadth (see Fig. 3) to assure engagement with gear ring 61 through the entire path of sleeve 33 within sleeve 30.

In the present instance, motor M is preferably the actuating element of an electrically interlocked system comprising a control element and a controlled element connected by lead wires and always assuming corresponding positions so that the controlled or actuating element turns a certain angle whenever the control element is rotated the same angle. Such devices are well known in the art, for example under the name of "Selsyn" control system.

After disengaging pawl 12 and lifting motor M the lens system can be adjusted by hand with the aid of knob 28 and fixed in any position with the locking brake, by turning handle 93 into the position shown in Fig. 13.

When it is desired to exchange the lens system, the brake is applied, lock ring 45 turned counter-clockwise, and the lens system drawn from sleeve 33. Another similar system (the various lens systems having the general appearance of Fig. 15) can then be inserted, tooth 124 and pin 125 securing the proper position with respect to sleeve 33 and the scale, and fastened to sleeve 33 by rotating ring 45 clockwise. Before loosening ring 45, the brake should be applied in order to retain sleeve 33 in place, which would otherwise move within sleeve 30, the ball thread offering practically no resistance.

It will now be evident that the principle of the present invention can be applied to constructions different from that shown herein by way of example, that the relative arrangement of fixed and movable portions, the mode of fastening the individual lens system to the master lens mount can be modified, or that the movement of the lens mount may be accomplished differently.

It should be understood that the present disclosure is for the purpose of illustration only and that this invention includes all modifications and equivalents which fall within the scope of the appended claims.

I claim:

1. A device of the character described comprising an apparatus structure with a hollow master mount support fixed thereto, a master mount adjustable within said support and substantially coaxial thereto, an optical system fitting said master mount, and means for attaching said system to said master mount.

2. A device of the character described comprising an apparatus structure with a hollow master mount support fixed thereto, a master mount adjustable within said support and substantially coaxial thereto, braking means for releasably fixing said master mount relative to said structure, an optical system fitting said master mount, and means for attaching said system to said master mount.

3. A device of the character described comprising an apparatus structure with a hollow master mount support fixed thereto, a master mount adjustable within said support and substantially coaxial thereto, means for controlling the relative position of said support and said master mount, an optical system fitting said master mount, and means for attaching said system to said master mount.

4. A device of the character described comprising an apparatus structure with a master mount support fixed thereto, a master mount adjustable within said support, means for releasably fixing said master mount relative to said structure, means for controlling the relative position of said support and said master mount, an optical system fitting said master mount, and means for attaching said system to said master mount.

5. A device of the character described comprising an apparatus structure with a hollow master mount support fixed thereto, a master mount adjustable within said support and substantially coaxial thereto, means for controlling the relative position of said support and said master mount, an optical system fitting said master mount, means for attaching said system to said master mount, and scale means indicating the relative position of said structure and said lens system.

6. A device of the character described comprising an apparatus structure with a master mount support fixed thereto, a master mount helically guided coaxially to said support, an optical system fitting said master mount, and means for attaching said system to said master mount.

7. A device of the character described comprising an apparatus structure with a master mount support fixed thereto, a master mount helically guided coaxially to said support, an optical system fitting said master mount, means for attaching said system to said master mount, and means for rotating said master mount for helically adjusting it relatively to said apparatus structure.

8. A device of the character described comprising an apparatus structure, a tubular master mount support fixed thereto and having an inside thread, a master mount within said support and having an outside thread, connecting members intermediate said support and said master mount engaging both threads for relative movement thereof, an optical system for insertion into said master mount, and means for attaching said system to said master mount.

9. A device of the character described comprising an apparatus structure, a tubular master mount support fixed thereto and having an inside thread, a master mount within said support and having an outside thread, balls intermediate said support and said master mount engaging both threads for relative helical movement between support and mount substantially without play, an optical system for insertion into said master mount, and means for attaching said system to said master mount.

10. A device of the character described comprising an apparatus structure, a tubular master mount support fixed thereto and having an inside thread, a master mount within said support and having an outside thread, connecting members intermediate said support and said master mount engaging both threads for relative movement thereof, an optical system for insertion into said master mount, means for attaching said system to said master mount, and means for controllably adjusting and fixing the relative position of support and master mount.

11. A device of the character described comprising an apparatus structure with a master mount support fixed thereto, a master mount adjustable within said support, braking means on said structure adapted effectively to engage said master mount, means for releasing and engaging said braking means, an optical system fitting said master mount and means for attaching said system to said master mount.

12. A device of the character described comprising an apparatus structure with a master mount support fixed thereto, a master mount adjustable within said support, braking means on said structure adapted effectively to engage said master mount, means for releasing and engaging said braking means and for locking it in engaging position, an optical system fitting said master mount and means for attaching said system to said master mount.

13. A device of the character described comprising a camera housing, a master mount support fixed thereto, a master mount helically adjustable within said support, an individual lens mount fitting said master mount, a lock ring rotatably fixed to said individual mount and having members adapted to engage corresponding wedge surfaces of said master mount, said individual mount being releasably attachable to said master mount by rotating said lock ring for effecting frictional engagement of said members and said surfaces.

14. A device of the character described comprising a camera housing, a master mount support fixed thereto, a master mount helically adjustable within said support, an individual lens mount fitting said master mount, and a lock ring rotatably fixed to said individual mount and having teeth radially protruding inwardly through slots of the individual mount, said master mount having recesses fitting said teeth and adjacent thereto wedge surfaces, said individual mount being releasably fixed to said master mount by inserting said teeth into said recesses and turning them into contact with said surfaces.

LLOYED E. WHITTAKER.